United States Patent Office 3,279,928

Patented Oct. 18, 1966

3,279,928

FLAME RETARDANTS, PROCESS FOR PRODUCING, AND ARTICLE COMPRISING THE SAME

Franklin I. L. Lawrence and Michael J. Pohorilla, Bradford, Pa., assignors to Kendall Refining Company, a corporation of Pennsylvania No Drawing. Filed June 7, 1960, Ser. No. 34,391
11 Claims. (Cl. 106—15)

This invention relates to compositions which display improved flame retardant properties. More specifically, the invention embraces flame retardant hydrocarbonaceous condensation products formed by contacting specific hydrocarbon starting materials with phosphorous pentasulfide at a temperature of at least about 400° F., for example, about 400° F. to about 600° F.

The utilization of flame retardant additives for roofing compositions, floor coverings, pipe coverings, and similar coating materials is known to the art. Compositions have been proposed which include organophosphorous compounds such as aryl phosphates, low molecular weight olefins treated with phosphorous pentachloride and phosphorous pentasulfide, and petroleum sludge treated with phosphoric or sulfuric acid.

Other substances which have been prepared and have achieved some commercial success and are employed, per se, as roofing compositions, floor coverings, electrical installations and the like are propane precipitated resins. It is known that the flame retardant properties of these resins may be improved by chemically condensing the resins with oxygen containing substances, such as elemental oxygen and air.

The art has, therefore, sought to combine appropriate materials to provide compositions having improved flame retardant properties. Although materials are known that have flame retardant characteristics, the search for materials having superior flame retardant properties has continued.

Accordingly, it is a primary object of this invention to provide a composition which displays improved flame retardant properties.

It is another object of the invention to provide a composition which is flame retardant and yet is substantially non-corrosive.

It is an additional object of the invention to provide a composition which has flame retardant properties and which does not require the incorporation of inorganic fillers, although the use of such fillers is not precluded.

In accordance with this invention, it has been found that certain high molecular weight viscous, resin-like petroleum hydrocarbons may be reacted with phosphorous pentasulfide to provide hydrocarbon condensation products which are excellent flame retardant agents. Moreover, the condensation products of the invention when subsequently reacted with sulfur- and/or oxygen-containing materials produce condensation products which exhibit not only flame retardant characteristics, but also are non-corrosive.

The resin-like hydrocarbon starting materials employed in the present invention are characterized by an average ebullioscopic molecular weight of at least about 1000. An optimum average ebullioscopic molecular weight range is from about 1200 to about 1700. Additionally, the starting materials are characterized by a viscosity of at least about 900 SUS at 210° F. The resin-like starting materials exhibit a degree of unsaturation and are characterized by a bromine number within the range of about 1 to about 10.

It is preferred that resin-like petroleum hydrocarbons which are utilized as starting materials for the production of the flame retarding agents of the invention contain more than about 2 naphthenic rings per molecule, which rings can be individually integrated with the paraffinic chain portion of the hydrocarbon molecules or condensed with aromatic rings and/or with other naphthenic ring systems. It is also preferred that the hydrocarbon starting materials contain an average of not more than about 50% aromatic carbon atoms.

Additionally, it is preferred that the resin-like petroleum fractions from which the flame retardant agents of the invention are produced contain not more than about 10% of wax-type materials. The wax content herein referred to is determinable by a procedure similar to that described under ASTM designation D–721–51T with the exception that methyl isobutyl ketone is employed to precipitate the wax, the sample size is reduced to 0.5 grams, and the determination is conducted at 0° F. While the starting materials which contain substantially more than 10% by weight of wax, as determined by this test, e.g., petrolatume which may reflect a wax content on the order of 40% by weight, can be employed in the production of the flame retardant agents of the invention, such materials are not preferred. Such materials best can be used by blending with more desirable starting materials, such as the preferred petroleum fractions above described, in proportions up to about 25% by weight of the total blend.

Resin-like hydrocarbons operable as starting materials in the invention can be obtained by conventional liquefied normally gaseous hydrocarbon precipitation processes from normal or vacuum distillation or residual stocks and analogous fractions of paraffin or mixed base crude oils. Pennsylvania crude oils are a particularly desired source for resin-like oils.

If it is desired to provide a more fluid composition which more readily may be handled at the outset of the reaction, the above described resins may be blended with up to about 30% of a lighter hydrocarbon diluent such as a bright stock or bright stock extract. Bright stocks may be derived from paraffinic, naphthenic or mixed base stocks. They are generally characterized by a molecular weight of about 400 to about 800 and an SUS viscosity at 210° F. of from about 100 to about 200. A typical paraffin-base bright stock may be derived by propane-dewaxing a Pennsylvania crude residual cylinder stock and phenol-extracting to about a 90% raffinate. These diluent stocks also react with the phosphorous sulfide and become integrated into the final condensation product. It will be understood that the term "petroleum resin" or "resin-like petroleum hydrocarbons" as employed herein embrace not only the resins, per se, but also the resins containing up to about 30% bright stock diluent. They may also comprise residual stocks and asphalts from other crude oil sources such as Midcontinent, Gulf Coast, East Texas, etc. The resins may be separated by treating reduced crude oils, or vacuum reduced crude oils with liquefied, normally gaseous paraffin hydrocarbons such as liquid propane before or after dewaxing and/or removing asphaltenes if these are present in excessive proportions.

The condensation products of the present invention are produced by contacting the above described resin-like hydrocarbon starting material while at a temperature of at least about 400° F. to about 600° F., preferably about 425° F. to about 575° F., with from about 2% to about 15% by weight, preferably between about 7% and about 12% by weight, of phosphorous pentasulfide for a time period requisite to produce an intermediate condensation product which of itself has flame retardant characteristics. On contact of the phosphorous pentasulfide condensation products with sulfur and/or oxygen, as hereinafter described, a final condensation product is produced which is both flame retardant and substantially non-corrosive.

The viscosity or ring and bell softening point of the flame retardant agents of this invention is not critical to the invention. However, since in most applications of the condensate of the invention a hard surface of the coating is desired, the new flame retardant agents are usually characterized by a ring and ball softening point as measured by ASTM method E28–42T of more than about 100° F. the viscosity or ring and ball softening point of a particular condensate will be dictated in the final analysis by the contemplated application of the material and the requirements for handling purposes imposed by the particular manufacturing processes utilizing the condensate.

The hydrocarbonaceous condensation products which constitute the flame retardant agents of this invention appear to result from the chain reaction of free radical intermediates which are formed thermally by the reaction of at least some of the molecules of the hydrocarbon starting materials with the phosphorous pentasulfide.

In the production of the condensation products of the invention the hydrocarbon is first heated to the reaction temperature, i.e., about 500° F., and then phosphorous pentasulfide is added slowly enough so that the foam caused by the generated hydrogen sulfide does not overflow the reaction vessel. This rate is generally about 0.25 part by weight of phosphorous pentasulfide per 100 parts by weight of hydrocarbon every 0.33 hours.

About 20 hours or more may be used to effect the condensation, but this extreme length of time is not preferred. It is preferred to limit the time at the elevated temperature to less than about 12 hours. The time required may be reduced down to a few minutes, provided the equipment can handle the large amount of foam produced.

If it is desired to produce a final condensate product which is substantially non-corrosive, the intermediate phosphorous pentasulfide condensation product may be treated further.

A first method for eliminating the corrosiveness of the intermediate phosphorous pentasulfide condensation products is to further react the intermediate condensation products, at from about 400° F. to about 600° F., with at least about 5% and preferably from 5 to about 15% elemental sulfur. The intermediate condensation product which is to be subsequently treated with sulfur must have been reacted with about 15% by weight or less of phosphorous pentasulfide. Condensation products reacted with more than 15% by weight of phosphorous pentasulfide may display corrosion characteristics which for certain purposes may be undesirable, and which cannot be corrected by the subsequent treatment with sulfur.

As in the initial condensation step, the rate of supply of elemental sulfur to the reaction mixture is not critical to the production of the final condensation products. Sulfur addition may be accomplished employing the method described above for the initial condensation with $P_2S_5$.

Most appropriately, sulfur may be added slowly to the reaction mixture at the temperature at which the initial condensation took place, i.e., about 500° F. The sulfur is added slowly enough so that the foam caused by the generated hydrogen sulfide does not overflow the reaction vessel. This rate is generally adjusted so that over a period of about 3 to about 6 hours, from about 5 to about 15% by weight of sulfur is added to the condensation product. Generally about 0.5 part by weight sulfur is added per 100 parts by weight of hydrocarbon every 0.25 hour. The amount of sulfur required in the sulfur condensation step depends upon the corrosive properties of the intermediate product and of the desired ring and ball softening point of the final condensation product.

A second method for reducing the corrosiveness of the intermediate condensation product entails the treatment of the intermediate condensate with an oxidizing agent, such as air; elemental oxygen; chlorine dioxide; nitrogen dioxide; hydrogen peroxide; various other inorganic peroxides; inorganic chlorates and perchlorates, such as sodium chlorate, potassium chlorate, sodium perchlorate, potassium perchlorate; organic peroxides, such as benzoyl peroxide, ditertbutyl peroxide, and the like; and organic hydroperoxides, for example, cumene hydroperoxide, and tertiary butyl hydroperoxide, although oxygen or air is preferred. The oxidation treatment of the intermediate condensation product requires only a short period, for example, about 0.5 hour to about 3.0 hours. In practice, the oxidation treatment is carried out at essentially the same temperatures as the initial condensation step, namely between about 400° F. to about 600° F. and preferably about 425° F. to about 500° F. The degree of oxidation required again depends upon the corrosiveness of the intermediate condensation product and the desired ring and ball softening point of the final condensation product.

It is to be understood that although the invention embraces the above two methods for providing non-corrosive phosphorous pentasulfide condensation products when each is employed alone, the invention also contemplates a treatment of the intermediate condensation products wherein both sulfur condensation and oxidation are employed in conjunction with each other.

The flame retardant agents contemplated by this invention can be employed in a wide range of uses such as in roofing compositions, floor coverings, pipe covering, electrical insulation, wall board, wood impregnants, molded articles, and the like. The condensed resins of this invention are adherent to metal, wood and surfaces generally. The phosphorous pentasulfide condensed resin of the present invention may be applied as a hot melt doctored or mopped on to the surface, or applied by dipping, spraying, or other suitable methods, or may be cut back with a suitable volatile solvent. Suitable volatile solvents which may be employed to disperse $P_2S_5$ condensates include hydrocarbon solvents such as hexanes, heptanes, octanes and the like including mixtures in the kerosene, naphtha and gas oil boiling range; aromatic solvents such as benzene, toluene, xylenes, and other alkylated aromatic fractions; chlorinated hydrocarbons including carbon tetrachloride, ethylene dichloride, trichloroethylenes, methylene chloride, and chloroform; miscellaneous solvents such as carbon disulfide. The cutback agents may be applied by any suitable method.

When the solvent cut-back type composition is employed as a coating for a combustible material which is capable of absorbing any retaining over extended periods, a portion of the solvent, the cut-back solvent should be of a type which is non-conducive to the combustibility of the material. For example, when a solvent cut-back resin is to be employed with a combustible material such as wood, a low boiling chlorinated aromatic should be employed as the solvent which in itself would impart flame retardancy if absorbed and retained by the wood.

Tests have been made to compare the flame retardant characteristics of the compositions of the present invention with commercial flame retardants now being marketed. Such commercial products are generally based on asphalts containing inorganic fillers such as asbestos, as well as certain phosphorus and chlorine fire retarding compounds. In addition, comparisons have been made between the phosphorus pentasulfide condensation products of the present invention and air blown resins derived from similar starting materials as the composition of the present invention.

Having generally described the invention, the following examples are presented to illustrate a process for preparation of the phosphorus pentasulfide-condensed resins and to demonstrate their utility as flame retardants. The following examples are not intended to limit the scope of the invention and are included only for purposes of illustration.

EXAMPLE 1

*Test procedure*

In the test procedure employed to determine the flame retardancy of the compositions of the invention and various other coating materials, test panels of the materials to be evaluated were prepared by coating steel plates, ¼" x 2" x 4", and white pine panels, ⅝" x ⅝" x 6", by immersing the plates or panels in the heated materials at 350–400° F. When the materials were cut-back with a solvent, the coating was effected by immersing at 77° F.

The coated plates hereafter called "panels" were positioned at an angle of 45° to a vertical test flame. The flame used in the test was provided by means of a Bunsen burner capable of producing a one-inch flame, measured to the top of the inside cone of the flame from the top of the burner. To evaluate completely the flame retardancy of the material, the burning phase was conducted in three steps. In the first step, the flame was applied to the test panel for 15 seconds and then removed. The length of time in seconds that the coating material continued to burn, if at all, after the removal of the flame was recorded. Thirty seconds after the removal from the initial flame test, the flame was again applied to the same area of the test panel for an additional 30 seconds and then removed. Again the length of time the coating continued to burn after flame removal was recorded. In step three, 30 seconds after the removal of the second flame test, the flame was again applied to the same area of the test panel for an additional 60 seconds. Again the length of time the coating continued to burn after flame removal was recorded. If, after step one or step two, the material continued to burn throughout the 30 second delay period, the test was discontinued on that specific panel, and the coating was recorded as having "fired."

*Preparation of resinous starting materials*

About 75,000 grams of a cylinder stock derived by distillation from paraffin base Pennsylvania crude oil and characterized by a boiling point in excess of about 850° F., a molecular weight of about 750, a viscosity at 210° F. of 225 SUS, an A.P.I. gravity of about 24.8, and a flash point (Cleveland open cup) of about 600° F. are mixed with propane heated to a temperature of about 190° F. and then cooled to a temperature of about 65° F. The cylinder stock-propane solution is thereafter transferred into a chilling tank wherein the pressure is reduced to an extent requisite to volatilize sufficient propane to lower the temperature of the solution to about −20° F. to about −50° F. Makeup propane is added during the chilling operation, such that the ratio of propane to cylinder stock is about 3 to 1 at the end of the chilling cycle. During the chilling cycle, petrolatum is precipitated from the solution. The chilled cylinder stock-propane solution containing precipitated petrolatum is transferred to a filter feed tank and hence passed through an appropriate filter to effect removal of the petrolatum from the chilled solution.

Propane is added to the filtrate in an amount sufficient to raise the propane-cylinder stock ratio to about 10 to 1 and the temperature of the solution so obtained is elevated to about 150° F. to 180° F. whereupon about 15,000 grams of high molecular weight viscous material are precipitated. This viscous material contained some propane.

The precipitated material so obtained is then mixed at a temperature of about 130° F. to 135° F. with additional propane to increase the propane-oil ratio to about 20 to 1. The temperature of the resulting solution is lowered to about 100° F. whereupon about 6,000 grams of viscous hydrocarbons are precipitated. These materials, after removal of all residual propane, are designated as heavy resins and are characterized by a molecular weight of about 1400, a viscosity of about 4100 SUS at 210° F., and a bromine number of 3.7.

The remaining oil-propane solution that is the extract from the last described step, is heated to about 150° F. whereupon 9,000 grams of additional viscous hydrocarbons which are designated as light resins are precipitated. Any residual propane in the resin is removed in a flash chamber. These light resins are characterized by a molecular weight of about 1300, a viscosity of about 1150 SUS at 210° F., and a bromine number of about 4.0.

*Flame retardant material*

750 grams of the viscous materials separated from the cylinder stock and designated as light resin, and 250 grams of bright stock extract are charged to a suitable apparatus and initially heated to about 500° F. Phosphorus pentasulfide is added to the mixture in increments totaling about 0.25% by weight of the mixture. Sulfide addition is maintained over a period of about 12 hours until a total amount of about 9% by weight of phosphorus pentasulfide is added. During the reaction period the temperature in the reaction zone is maintained at about 500° F. to produce an intermediate condensation product which is corrosive to a copper strip when tested pursuant to ASTM Procedure D–130. To eliminate the corrosiveness, the intermediate product is contacted wih sulfur to effect further condensation. Sulfur is incorporated into the reaction mixture maintained at approximately 500° F. in increments, for a period of approximately 4 hours until a total of about 12% by weight of sulfur has been added to provide a final condensation product which has a ring and ball softening point of about 205° F. and is noncorrosive to a copper strip when tested as described above.

The bright stock extract referred to is a fraction of Pennsylvania crude oil removed from Pennsylvania bright stock by phenol extraction and characterized by a viscosity of about 1210 SUS at 210° F., a viscosity of about 840,000 SUS at 100° F. and a gravity of about 10.5° API.

EXAMPLE II

To demonstrate the flame retardant properties of the composition of the invention the condensation product of Example I was tested according to the flame testing procedure set forth above. In test No. 1, the condensation product was melted and applied to a metal panel by dipping. In test No. 2, the product was cut-back by dissolving it in a straight run overhead distillate from Pennsylvania crude oil characterized by a distillation range of about 300° to 370° F., Tagliabue flash point (ASTM D56–56) of about 100° F., a gravity of about 52° API, and an aniline point of about 135° F. The results of the tests are reflected in Table I.

TABLE I

| | Steel | |
|---|---|---|
| Test No. | 1 | 2 |
| Composition, Percent | | |
| $P_2S_5$ condensed resins | 100 | 55 |
| Cut-back solvent | | 45 |
| Panel Burning Time After Flame Application (sec.): | | |
| 1 (15 sec. Exp.) | 0 | 0 |
| 2 (Next 30 sec. Exp.) | 0 | 0 |
| 3 (Next 60 sec. Exp.) | 0 | 0 |

EXAMPLE III

To compare the effectiveness of flame retardant compositions of the invention, tests were conducted employing products prepared by air condensation of starting hydrocarbon materials similar to those used in preparing the compositions of the invention. Resin A was an air-condensed product characterized by a ring and ball softening point of about 250° F. and an ASTM 100 gram needle penetration of about 43 at 77° F., prepared from starting materials consisting of 90% light resins and 10% bright stock described above. Resin B was an air-condensed product characterized by a ring and ball softening point of about 250° F. and an ASTM 100 gram needle penetration of about 18 at 77° F., prepared from the heavy resins described in Example 1. The air-condensed resins were tested according to the procedure of Example 1 alone and cut-back with the solvent of Example II. The results of the tests are reflected in Table II. From a comparison of the results shown in Tables I and II, it is seen that the products of this invention possess much greater fire retardant properties than the air-condensed resins. The latter are used in fire retardant compositions containing mineral fillers such as asbestos.

TABLE II

| | Steel | | | | Wood | | | |
|---|---|---|---|---|---|---|---|---|
| Test No. | 5 | 6 | 7 | 8 | 9 | 10 | 11 | 12 |
| Composition, Percent: | | | | | | | | |
| A | 100 | 50 | ---- | ---- | 100 | 50 | ---- | ---- |
| B | ---- | ---- | 100 | 50 | ---- | ---- | 100 | 50 |
| Cut-back Solvent | ---- | 50 | ---- | 50 | ---- | 50 | ---- | 50 |
| Panel Burning Time After Flame Application (sec.): | | | | | | | | |
| 1 (15 sec.) | 0 | 0 | 0 | 0 | 30 | 30 | 30 | 30 |
| 2 (Next 30 sec.) | 12 | 30 | 9 | 14 | (1) | (1) | (1) | (1) |
| 3 (Next 60 sec.) | 30 | (1) | 30 | 30 | ---- | ---- | ---- | ---- |

[1] Fired.

EXAMPLE IV

Additional tests were conducted as described in Example I employing compositions which find utility as commercial flame retardants. Composition C was an air-blown asphalt produced from California crude oil residuum and characterized by a ring and ball softening point of about 212° F. Composition D was another air-blown asphalt produced from Mid-Continent crude oil residuum and characterized by a ring and ball softening point of about 202° F. Compounds C and D were coated as hot melts. Compositions E and F were completely compounded commercial flame retardants containing air condensed light resins having a ring and ball softening point of about 120° F. and inorganic fillers such as asbestos. Compositions E and F are designated commercially as 60/60N and 60/60, respectively, and contain, in addition to the materials mentioned above, low boiling, chlorinated aromatic hydrocarbons as solvents. The results of the tests are reflected in Table III.

TABLE III

| | Steel | | | | Wood | | | |
|---|---|---|---|---|---|---|---|---|
| Test No. | 13 | 14 | 15 | 16 | 17 | 18 | 19 | 20 |
| Composition, Percent: | | | | | | | | |
| C | 100 | ---- | ---- | ---- | 100 | ---- | ---- | ---- |
| D | ---- | 100 | ---- | ---- | ---- | 100 | ---- | ---- |
| E | ---- | ---- | 100 | ---- | ---- | ---- | 100 | ---- |
| F | ---- | ---- | ---- | 100 | ---- | ---- | ---- | 100 |
| Panel Burning Time After Flame Application (sec.): | | | | | | | | |
| 1 (15 sec.) | 30 | 30 | 0 | 0 | 30 | 30 | 0 | 0 |
| 2 (Next 30 sec.) | (1) | (1) | 0 | 0 | (1) | (1) | 4 | 2 |
| 3 (Next 60 sec.) | ---- | ---- | 0 | 0 | ---- | ---- | 6 | 12 |

[1] Fired.

It will be noted that the mastics in tests 15 and 16 demonstrate results comparable to those observed for the compositions of the invention. The mastics, however, are heavily compounded with inorganic fillers such as asbestos and owe much of their flame retardant properties to the flame retardant inorganic portion. The distinct advantage of the $P_2S_5$ condensates is that excellent flame retardant properties are obtained without the need for inorganic fillers.

EXAMPLE V

The procedure of Example I was repeated employing hydrocarbon materials consisting of 90% light resins and 10% bright stock. The hydrocarbon material was reacted with 8% $P_2S_5$ and subsequently reacted with sulfur to provide a finished non-corrosive product having a ring and ball softening point of 235–248° F.

When tested for flame resistance according to the test of Example I, the results were the same as those shown in Example II.

EXAMPLE VI

The procedure of Example I was repeated employing hydrocarbon materials consisting of 90% light resins and 10% bright stock. The hydrocarbon material was reacted with $P_2S_5$ to provide a finished product having a ring and ball softening point of 235–248° F. The composition had flame resistance.

EXAMPLE VII

Seventy percent light resins raffinate cut-back with 30% of the bright stock of Example I was reacted with 9% by weight of $P_2S_5$, then with 8% by weight of sulfur and finally was air finished to provide a noncorrosive product having a ring and ball softening point of 135° F.

When tested for flame resistance according to the tests of Example I, the results were about the same as those shown in Example II.

EXAMPLE VIII

The process of Example I was repeated employing 8% by weight of $P_2S_5$ and 8% by weight of S.

When tested for flame resistance according to the test of Example I, the results were about the same as those shown in Example II.

EXAMPLE IX

The process of Example I was repeated employing oxygen for the second condensation.

When tested for flame resistance according to the test of Example I, the results were about the same as those shown in Example II.

It will be apparent that other materials such as pigments and the like may be incorporated into the coating of this invention.

Since modifications will be apparent to those skilled in the art, it is intended that this invention be limited only by the scope of the appended claims.

We claim as our invention:

1. An article rendered fire-resistant by means of a composition consisting essentially of a heavy petroleum residue which has been reacted at about 400° F. to about 600° F. with about 2% to about 15% by weight of a phosphorous sulfide to form a condensation product, said composition having a ring and ball softening point of at least about 100° F., said heavy petroleum residue having a molecular weight of at least about 1,000 and a bromine number of less than about 10.

2. An article rendered fire-resistant by means of a composition consisting essentially of a heavy petroleum residue which has been reacted at about 400° F. to about 600° F. with about 2% to about 15% by weight of a phosphorous sulfide to form a condensation product, said composition having a ring and ball softening point of at least about 100° F., said heavy petroleum residue having a molecular weight of at least about 1,000 and a bromine number of less than about 10, the reaction product from said reaction being further heated at about 400° F. to about 600° F. with a material selected from the group consisting of sulfur and oxygen.

3. The article of claim 2 wherein the phosphorous sulfide is $P_2S_5$ and wherein the reaction product is heated with from about 5% to about 15% of elemental sulfur.

4. The article of claim 1 wherein the heavy petroleum residue is a resinous product produced by extracting a heavy petroleum residue with a liquified normally gaseous hydrocarbon.

5. The article of claim 4 wherein the petroleum resin contains less than about 10% of wax.

6. A method for treating combustible materials to render them fire-resistant which comprises incorporating therewith a composition consisting essentially of a heavy petroleum residue which has been reacted at about 400° F. to about 600° F. with about 2% to about 15% by weight of a phosphorous sulfide to form a condensation product, said composition having a ring and ball softening point of at least about 100° F., said heavy petroleum residue having a molecular weight of at least about 1,000 and a bromine number of less than about 10.

7. A composition for treating combustible materials to render them fire-resistant consisting essentially of a heavy petroleum residue which has been reacted at about 400° F. to about 600° F. with about 2% to about 15% by weight of a phosphorous sulfide to form a condensation product, said composition having a ring and ball softening point of at least about 100° F., said heavy petroleum residue having a molecular weight of at least about 1,000 and a bromine number of less than about 10, the reaction product from said reaction being further heated at about 400° F. to about 600° F. with a material selected from the group consisting of sulfur and oxygen.

8. A process for producing a fire-resistant composition which comprises subjecting a heavy petroleum residue having a molecular weight of at least about 1,000 and a bromine number of less than about 10 to condensation with about 2% to about 15% by weight of a phosphorous sulfide at a temperature of about 400° F. to about 600° F. to form a condensation product, thereafter subjecting the resultant reaction product at a temperature within said temperature range to further condensation with a material selected from the group consisting of sulfur and oxygen.

9. The process of claim 8 wherein the petroleum residue is a petroleum resin produced by extracting a heavy petroleum residue with a liquified normally gaseous paraffin hydrocarbon.

10. The process of claim 9 wherein the phosphorous sulfide is $P_2S_5$.

11. The process of claim 9 wherein the phosphorous sulfide is $P_2S_5$ and the reaction product is reacted with about 5% to about 15% of elemental sulfur.

References Cited by the Examiner

UNITED STATES PATENTS

| | | | |
|---|---|---|---|
| 1,846,186 | 2/1932 | Cline et al. | 106—274 |
| 2,450,756 | 10/1948 | Hoiberg | 106—274 |
| 2,673,815 | 3/1954 | Bartleson | 106—273 |

OTHER REFERENCES

Abraham, "Asphalts and Allied Substances," Fifth edition, volume I, D. Van Nostrand Co., Inc., New York, 1945; page 468, paragraphs (a) and (c).

Ibid, volume II, page 1196.

ALEXANDER H. BRODMERKEL, *Primary Examiner.*

JOSEPH REBOLD, MORRIS LIEBMAN, *Examiners.*

J. POER, J. B. EVANS, *Assistant Examiners.*